F. W. SINKS.
TOASTER.
APPLICATION FILED NOV. 15, 1911.
1,054,321.
Patented Feb. 25, 1913.
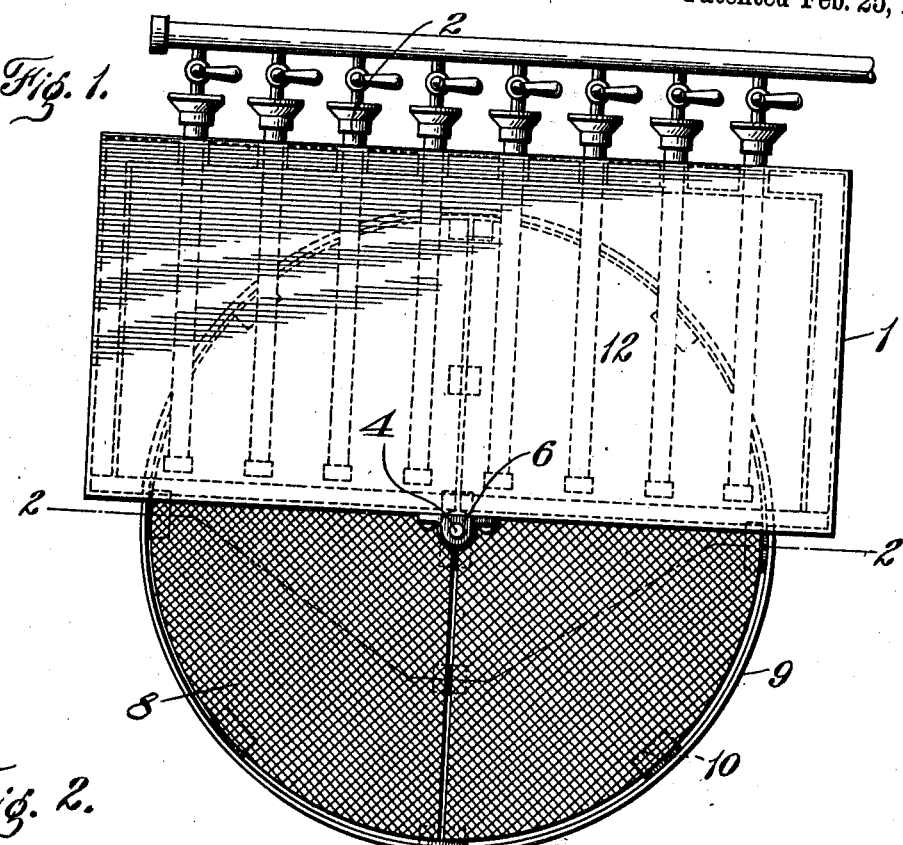
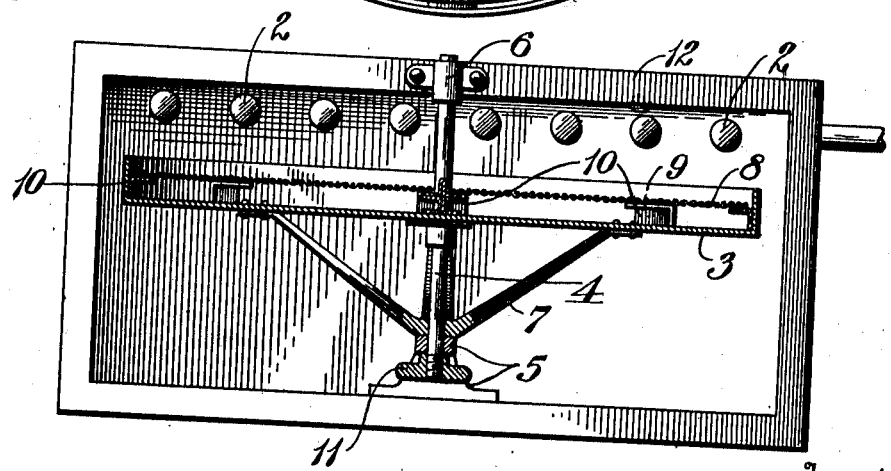
Witnesses
Chas. W. Stauffiger
A. M. Shannon
Inventor
Frank W. Sinks,
By Bartley & Bartley
Attorneys

UNITED STATES PATENT OFFICE.

FRANK W. SINKS, OF DETROIT, MICHIGAN.

TOASTER.

1,054,321.  Specification of Letters Patent.  Patented Feb. 25, 1913.

Application filed November 15, 1911. Serial No. 660,338.

*To all whom it may concern:*

Be it known that I, FRANK W. SINKS, a citizen of the United States of America, residing at Detroit, in the county of Wayne and State of Michigan, have invented certain new and useful Improvements in Toasters, of which the following is a specification, reference being had therein to the accompanying drawings.

In preparing toast for use in restaurants, cafés, hotels and lunch counters, it is desirable that the operator be able to regulate the application of heat readily to vary the toast to suit individual preferences of customers as well as to produce large quantities in short spaces of time to fill orders rapidly. It is also desirable that the operator be shielded from the heat to be enabled to carry on the work.

This invention relates to a toaster and more especially to one adapted for use at lunch counters, in hotels, restaurants and so-called "quick lunch" places and includes means whereby the operator not only manipulates the apparatus without annoyance from the heat but is enabled to vary the application of the heat as desired.

The invention consists in the matters hereinafter set forth and more particularly pointed out in the appended claims.

In the drawings, Figure 1 is a plan view of one form of toaster that embodies features of the invention; and Fig. 2 is a view, partially in elevation and partially in section, taken on or about line 2—2, of Fig. 1.

As herein indicated, a suitable casing 1 preferably rectangular with one open side, supports a battery of burners 2, or other preferred heating means. The burner or other heating device is disposed to present a comparatively large area of heating surface in a substantially horizontal plane.

A turn-table 3 is carried on a spindle 4 that is journaled mid-way of the open side of the casing in an upright position, as in a step bearing 5 and guide bearing 6 or in any preferred and suitable manner. Spider arms 7 or the like stiffen and support the outer portions of the turn-table. A grill 8 of open wire-work or the like is supported on the turn-table preferably within a rotating flange 9 around the margin of the latter on suitably arranged brackets or angle irons 10. For purposes of convenience in cleaning, the grill is made in halves, the diametrical division between them allowing their ready insertion around the stem or supporting spindle. A handle 11, of non-conducting material if desired, is mounted on the spindle below the turn-table for ready manipulation of the latter. The table and grill are disposed at an interval below and substantially parallel to the plane of the burners 2 or other heating means employed so that bread or other articles placed upon the grill or that portion of it which projects beyond the side of the casing 1 may be readily swung under the heating means and into the zone of action thereof. The top plate 12 of the casing above the heating means may be utilized as a griddle or the like for cooking.

In operation articles placed upon the grill by the operator are readily turned into close proximity to the heating means and may be readily brought out again for inspection and for turning on the grill. The bread or other articles may be made to traverse through a greater or less heated space according to their position from the center of the turn-table. As the operator can stand at some distance from the heated portion of the casing proper and at the same time readily inspect the contents of the turn-table, the heat is not inconvenient. Large quantities of toast or the like are produced by this device very rapidly.

Obviously, changes in the details of construction may be made without departing from the spirit of the invention, and I do not care to limit myself to any particular form or arrangement of parts.

What I claim is:—

1. A toaster comprising a casing having an opening in one side, heating means disposed in a substantially horizontal plane below the top of the casing, a spindle journaled on the casing across the opening in upright position, and a turn-table mounted on the spindle in substantially parallel relation to the heating means.

2. A toaster comprising a substantially rectangular casing having an opening in one wall, heating means disposed in a horizontal plane at an interval below the top thereof, a spindle journaled in upright position across the opening of the casing, a turn-table mounted on the spindle in substantially parallel relation to the heating means, and a grill removably supported on the turn-table.

3. A toaster comprising a substantially rectangular casing having an opening in one side, heating means disposed in a horizontal plane at an interval below the top thereof, a spindle journaled in upright position on the side of the casing across the opening, a turn-table mounted on the spindle in substantially parallel relation to the heating means, a grill removably supported on the turn-table, and a handle of heat insulating material on the spindle.

4. A toaster comprising a substantially rectangular casing having an open side, heating means disposed in a parallel plane below the top of the casing and adjacent thereto, an upright spindle rotatably secured on the open side of the casing, a turn-table secured on the spindle, a grill consisting of sections each removably mounted on the turn-table, and means for supporting the grill at an interval above the turn-table.

In testimony whereof I affix my signature in presence of two witnesses.

FRANK W. SINKS.

Witnesses:
C. R. STICKNEY,
A. M. DORR.